Patented Sept. 13, 1927.

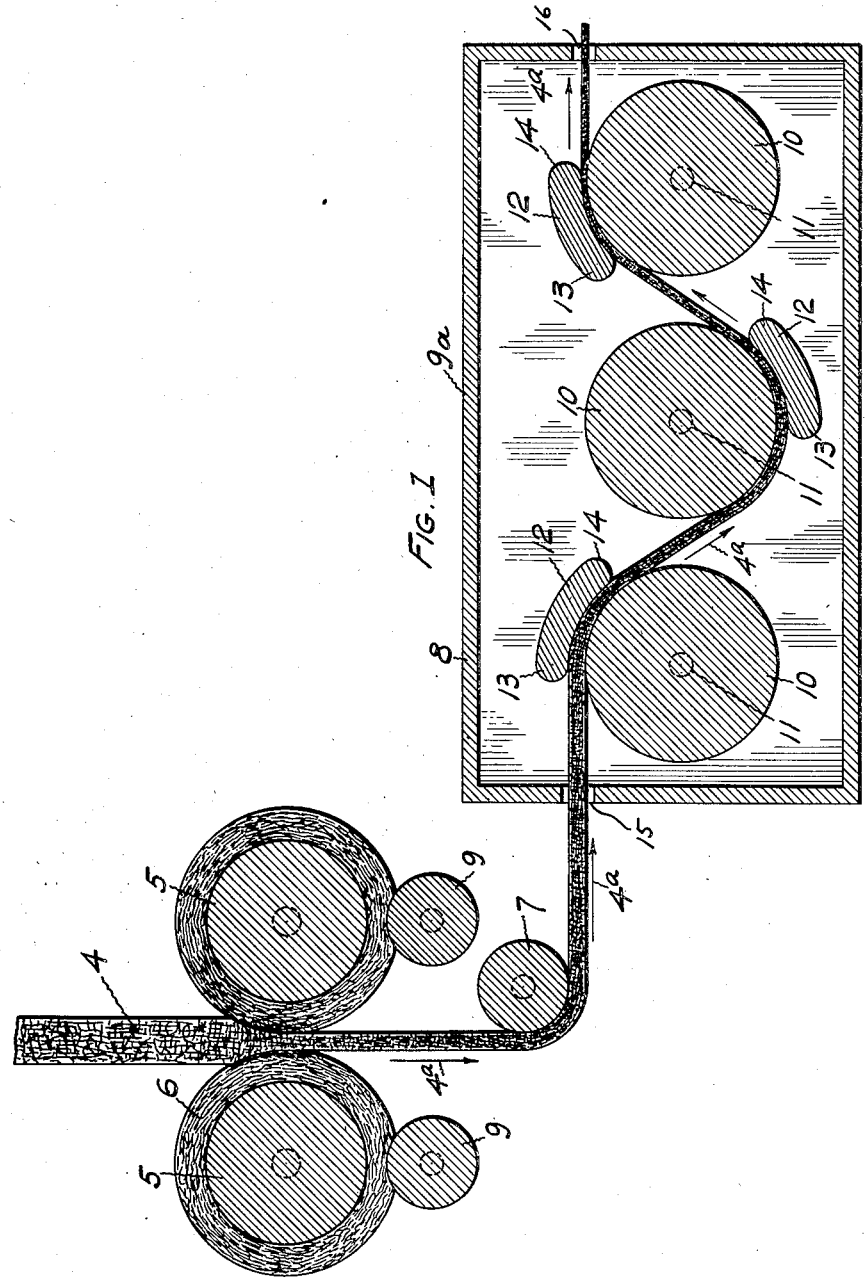

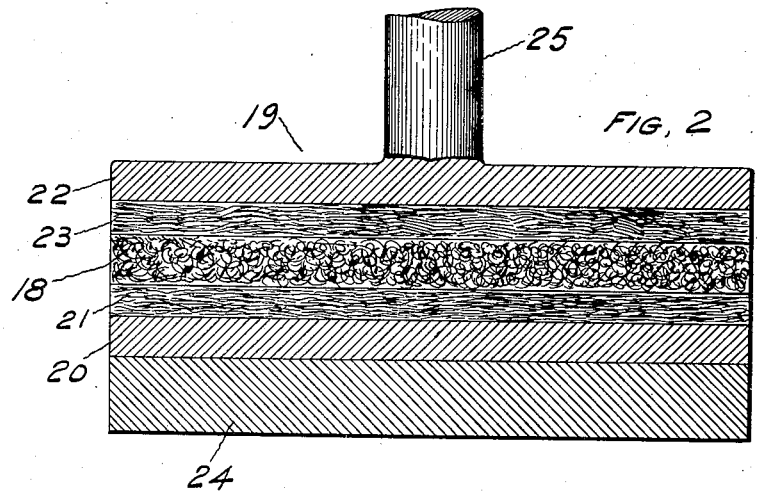
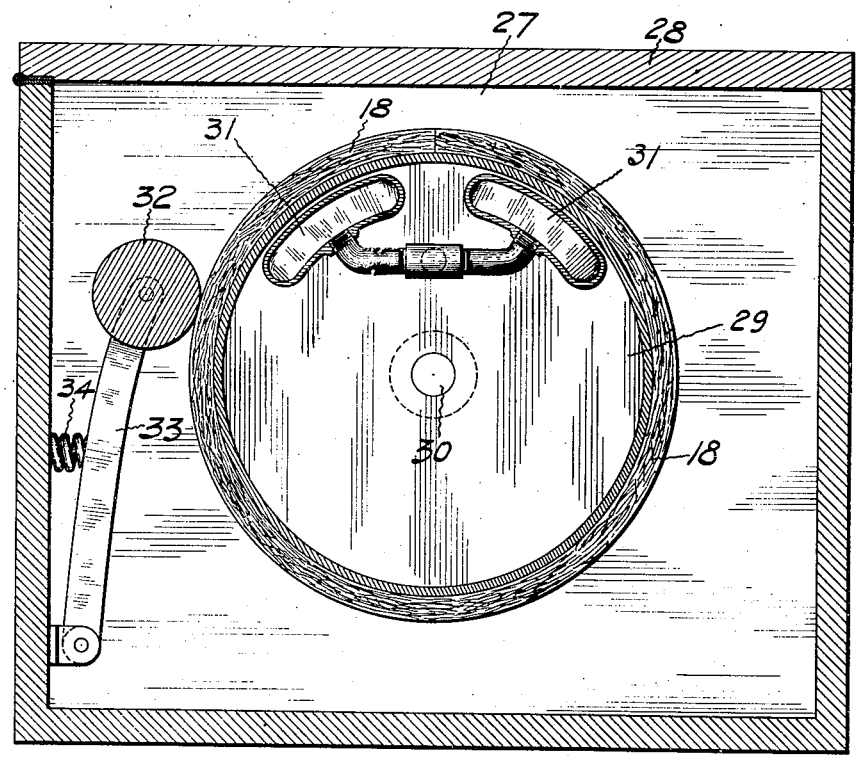

1,642,008

UNITED STATES PATENT OFFICE.

PAUL BEEBE, OF AKRON, OHIO, ASSIGNOR TO THE GOODYEAR TIRE & RUBBER COMPANY, OF AKRON, OHIO, A CORPORATION OF OHIO.

MACHINE FOR MAKING A RUBBERIZED FIBROUS COMPOSITION.

Application filed November 15, 1922. Serial No. 601,195.

My invention pertains to a fibrous composition which may be adapted for many uses, such, for example, as floor or wall coverings, for the manufacture of shoes, as a substitute for leather, or for any other purposes for which a tough, flexible, porous, water-resistant material may be employed. My invention has particular relation to a novel process of drying material of the character in question, and to a machine for performing this operation.

One object of my invention consists in providing a method of drying a rubberized fibrous material by means of which the total quantity of liquid with which the material is impregnated may be removed therefrom while maintaining the rubber in a plastic state. Another object of my invention resides in providing machines for drying material in accordance with the above mentioned method.

In the accompanying drawings:

Fig. 1 is a cross-sectional view of a machine adapted for drying a continuously produced sheet of fibrous material;

Fig. 2 is a cross-sectional view illustrating a modified form of my invention, which is particularly adapted for subjecting material intermittently introduced thereto to a preliminary drying operation; and Fig. 3 is a cross-sectional view of a machine constructed in accordance with the modified form of my invention, and adapted to cooperate with the machine illustrated in Fig. 2. The machine illustrated in Fig. 3 is particularly adapted to subject the intermittently introduced material to the final drying operation.

In practicing my invention, I mix a quantity of fibers in a rubber solution. The rubber is then precipitated upon the fibers either by the addition of a rubber precipitant, by the proper regulation of the temperature of the mixture, or any other desired method. The rubber coated fibers may then be removed from the liquid either in the form of a mat made upon a Fourdriner machine, producing a continuous sheet of material, or by simply passing the liquid with the fibers suspended therein through an ordinary flat screen, whereby separate sheets of material may be intermittently produced. The term "fibrous material" is not to be understood to include textile products such as cord or square woven fabric, but is to include all unspun fibrous material which may be evenly and homogeneously distributed to form a composition of matter.

If the material has been formed into a mat by means of a Fourdrinier machine, it is then introduced to a dryer of the continuous type, as illustrated in Fig. 1, in which a continuously moving strip of material 4 is caused to pass between two relatively large roller members 5 disposed in side by side relationship, and is compressed thereby. The rollers 5 are each provided with a thick covering 6 of felt, or other suitable material, which engages the material 4. In compressing the material 4 a relatively large amount of liquid is extracted therefrom, which is immediately absorbed by the felt coverings 6 of the rollers 5. The material passes from the rolls 5 over a guiding idling roller 7, in the direction indicated by the arrows 4ª, through a drying chamber 8, for the final drying operation. Each of the rollers 5 is provided with a wringer roller 9, disposed therebeneath and in engagement with the felt covering 6, so as to compress the same and remove any liquid contained therein, thus insuring the presentation of a dry surface to the incoming material at all times.

The drying chamber 8 comprises a container 9ª which has mounted therein a plurality of rotatable drum members 10 mounted upon shafts 11, which are geared together so as to be operated at exactly the same speed. Disposed adjacent to the periphery of the drum 10, and at such point as to insure contact with the fibrous material, are disposed a plurality of ironing shoes 12 which are heated by any desired means, such, for example, as electricity, steam, or the like. The ironing shoes serve to dry the material which is carried into engagement therewith by means of the rotatable drum members 10.

The ironing shoes 12 are so disposed with respect to the drum members 10 that the leading edges 13 are disposed at a greater distance from the shaft 11 than are the trailing edges 14 with respect to the rotation of the drum members 10. This inclination of the ironing shoes 12 causes a gradual compression of the material 4 as it passes between the drum members 10 and the cooperating ironing shoes 12. The distance between the ironing shoes and the drums 10, or the inclination of the shoes with respect to the drum, may be varied at will so as to be adapted for use with material of various thicknesses.

Each of the successive cooperating drum and ironing units, of which there may be any desired number, serves to further dry and compress the material so that under ordinary conditions the thickness of the material 4 entering the drying chamber 8 at the forward end of the container, through an opening 15, is of materially greater thickness than when it emerges from the container through an exit 16 provided at the rear end of the machine, as indicated.

It is understood, of course, that the invention may be practiced without employing heat, if desired, the liquids in the rubber being permitted to evaporate therefrom at normal room temperature. During the evaporation period, the material should be subjected to a continuous pressure or occasionally subjected to sufficient pressure to move the semi-dry particles of rubber into engagement with each other. This forms the particles in to a homogeneous mass and prevents them from drying in a state independent of each other. However, it is believed to be desirable to employ heat in order to speed up the drying operation.

If the material is subjected to heat alone or is permitted to evaporate in the air without any pressure thereon, the particles will be dried in the form of small, independent units, and if subsequently pressed together, will move into engagement with each other, but will not unite to form an integral mass. However, if the material is simultaneously heated and compressed, the pressure being gradually increased if desired, the rubber particles, or the rubber coated fibers, will be pressed together while still in a plastic state, thus causing the various rubber particles or rubber coated fibers to be welded together into a homogeneous mass. It is absolutely essential that the individual particles of rubber do not lose their plasticity until the material has been compressed to its ultimate thickness.

The drying chamber 8 may be evacuated if desired, and the drum members 10 may be heated with the ironing shoes 12 being employed only to exert the desired pressure on the material. Also, if desired, the drum 10 and the shoes may both be heated.

If the material has been formed into a mat by straining the rubber coated fibers from the liquid, in which they are suspended by means of a separate flat screen, it may be desirable to employ drying apparatus of the types illustrated in Figs. 2 and 3. The structure illustrated in Fig. 2 is employed for subjecting the material to an initial drying operation, which in practice serves to remove approximately 90% of the liquid from the rubber. The structure illustrated in Fig. 3 is employed for the final drying operation and serves to remove the remainder of the liquid from the rubber.

In the structure illustrated in Fig. 2 a piece of fibrous material 18, which consists of fibers coated with rubber and arranged in a matted relation with each other, is disposed in a press 19 which comprises a lower stationary platen 20 provided with a thick layer of felt 21, which serves as a support for the material 18, and an upper movable platen 22 which is provided with a correspondingly thick layer of felt 23. The platen 20 is supported upon a pedestal or other suitable foundation 24, and the platen 22 is supported upon a ram 25.

The material 18, as it is taken from the screen upon which it has been strained from the liquid, is placed upon the felt 21, and the platen 22 is moved toward the platen 20 bringing the felt member 23 into engagement with the top surface of the material 18. Pressure is then applied upon the mat 18 by the platen 22 through the agency of the ram 25, thus compressing the material 18 and causing the felt members 21 and 23 to absorb approximately 90% of the liquid originally contained in the mat 18. The mat is then removed from the pressing member 19, and the felts 21 and 23 are dried either by compression or evaporation, or both, to render them suitable for the next succeeding operation.

The partially dried mat 18 is then placed within a container 27, as indicated in Fig. 3. The container is provided with a lid or side closure member 28, which is hingedly mounted thereon. Disposed within the container 27 is a rotatable drum 29 mounted upon a shaft 30. The material to be dried, indicated at 18, is mounted upon the drum member 29 in any desired manner. The shaft 30 is adapted to be rotated by any suitable power operating means, not shown. The drum member 29 is heated by means of members 31, which are adapted to be heated either by steam or electricity, the use of gas burners being avoided owing to the general volatile nature of many of the more common rubber solvents.

Disposed in engagement with the outer surface of the material 18, when mounted upon the drum member 29, is a roller member 32 which is rotatably mounted upon a supporting member 33 which is in turn pivotally mounted within the container 27. A spring member 34 serves to hold the roller member 18 in engagement with any material mounted upon the surface of the drum 29. Thus, as the drum 29 is rotated, the material is heated by means of the heating members 31, or any other suitable source of heat, and is gradually compressed by means of the roller member 32. The pressure exerted by means of the roller member 32 may be rendered adjustable if so desired. Also, the container 27 may be evacuated, but evacuation of the chamber is not believed necessary to complete success of the apparatus.

Although I have illustrated several forms which my invention may assume, and have described in detail several applications thereof, it will be obvious to those skilled in the art that it is not so limited, but that various modifications and changes may be made therein without departing from the spirit of my invention, or from the scope of the appended claims.

What I claim is:

1. A machine for forming and drying a sheet of fibrous composition containing a liquid that comprises felt members for engaging the opposite sides of the sheet, adapted to absorb the liquid therefrom, means for removing the absorbed liquid from the felt and drying drums having ironing shoes adjacent thereto for completing the forming and drying operation.

2. A machine for drying a fibrous material which comprises a rotatable drum adapted to have the fibrous material disposed on the periphery thereof, and means disposed adjacent to the periphery of the drum adapted to engage and compress the material as the drum rotates, the leading edge of said means being disposed a greater distance from the drum periphery than is the trailing edge thereof.

In witness whereof, I have hereunto signed my name.

PAUL BEEBE.